US011174880B2

(12) United States Patent
Mizukami et al.

(10) Patent No.: US 11,174,880 B2
(45) Date of Patent: Nov. 16, 2021

(54) ACCUMULATOR

(71) Applicant: NHK SPRING CO., LTD., Yokohama (JP)

(72) Inventors: Hiroshi Mizukami, Yokohama (JP); Ippei Iwai, Yokohama (JP); Mieko Yanagida, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 40 days.

(21) Appl. No.: 16/492,708

(22) PCT Filed: Jan. 25, 2018

(86) PCT No.: PCT/JP2018/002293
§ 371 (c)(1),
(2) Date: Sep. 10, 2019

(87) PCT Pub. No.: WO2016/168215
PCT Pub. Date: Sep. 20, 2018

(65) Prior Publication Data
US 2020/0049168 A1    Feb. 13, 2020

(30) Foreign Application Priority Data
Mar. 13, 2017    (JP) .............................. JP2017-047750

(51) Int. Cl.
*F16L 55/04*    (2006.01)
*F15B 1/10*    (2006.01)
*F16L 55/053*    (2006.01)

(52) U.S. Cl.
CPC ............ *F15B 1/103* (2013.01); *F16L 55/053* (2013.01)

(58) Field of Classification Search
CPC .............................. F15B 1/103; F16L 55/053
(Continued)

(56) References Cited

U.S. PATENT DOCUMENTS 2,365,994 A * 12/1944 Ashton ................... F15B 1/103
138/31
2,934,093 A * 4/1960 Bleasdale ................. F15B 1/24
138/31
(Continued)

FOREIGN PATENT DOCUMENTS

CN          100416112 C      9/2008
EP            1323928 A1     7/2003
(Continued)

OTHER PUBLICATIONS

Extended European Search Report issued in European Appln. No. 18768173.9 dated Feb. 6, 2020.
(Continued)

*Primary Examiner* — James F Hook
(74) *Attorney, Agent, or Firm* — Rossi, Kimms & McDowell LLP (57) ABSTRACT

An accumulator includes a pressure vessel and a partition portion separating an interior space of the pressure vessel into a liquid chamber and a gas chamber so that a volume ratio between the liquid chamber and the gas chamber in the pressure vessel is variable. The pressure vessel includes a first section including a thread portion for fastening the accumulator to a support member and a second section joined to the first section and formed by a single piece including a tool engagement portion capable of engaging with a tool for rotating the accumulator. The first section and the second section are fitted together by mating portions coaxial with the thread portion and the tool engagement portion.

10 Claims, 10 Drawing Sheets

(58) Field of Classification Search
USPC .................................................. 138/30, 31
See application file for complete search history.

(56) References Cited

U.S. PATENT DOCUMENTS

| | | | | |
|---|---|---|---|---|
| 3,961,646 | A * | 6/1976 | Schon | F16L 55/052 138/30 |
| 4,274,446 | A * | 6/1981 | Zahid | F15B 1/14 138/30 |
| 4,452,276 | A | 6/1984 | Hozumi | |
| 6,525,290 | B2 * | 2/2003 | Shimbori | B23K 11/002 219/91.2 |
| 6,527,012 | B1 * | 3/2003 | Weber | F15B 1/103 138/30 |
| 6,616,247 | B2 * | 9/2003 | Mohr | F15B 1/103 138/30 |
| 7,325,571 | B2 | 2/2008 | Shimbori | |
| 8,496,030 | B2 * | 7/2013 | Baltes | F15B 1/103 138/31 |
| 9,551,360 | B2 | 1/2017 | Hillesheim | |
| 10,851,804 | B2 * | 12/2020 | Yamamoto | F15B 1/106 |
| 2002/0020758 | A1 * | 2/2002 | Umetsu | F15B 1/103 239/88 |
| 2003/0116209 | A1 | 6/2003 | Umetsu | |
| 2006/0037658 | A1 | 2/2006 | Shimbori | |
| 2007/0102052 | A1 | 5/2007 | Yoshihara | |
| 2009/0133768 | A1 | 5/2009 | Miyake | |
| 2010/0108168 | A1 | 5/2010 | Ota | |
| 2010/0193059 | A1 | 8/2010 | Nakaoka | |
| 2011/0226370 | A1 * | 9/2011 | Arikawa | F15B 20/00 138/30 |
| 2012/0006438 | A1 * | 1/2012 | Nakaoka | F15B 1/103 138/30 |
| 2014/0053542 | A1 | 2/2014 | Giorgini et al. | |

FOREIGN PATENT DOCUMENTS

| | | |
|---|---|---|
| EP | 2910794 A1 | 8/2015 |
| EP | 2930374 A1 | 10/2015 |
| GB | 2419381 A | 4/2006 |
| JP | 2005155785 A | 6/2005 |
| JP | 2006057796 A | 3/2006 |
| JP | 2007192290 A | 8/2007 |
| JP | 3148349 U | 2/2009 |
| JP | 2009236137 A | 10/2009 |
| JP | 2010112431 A | 5/2010 |
| JP | 2012002342 A | 1/2012 |
| JP | 2012237415 A | 12/2012 |
| KR | 101166371 B1 | 7/2012 |
| KR | 101522984 B1 | 5/2015 |

OTHER PUBLICATIONS

Office Action issued in Japanese Appln. No. 2017-047750 dated Apr. 21, 2020. English machine translation provided.
Office Action issued in Korean Appln No. 10-2019-7025531 dated Aug. 13, 2020. English machine translation provided.
Office Action issued in Korean Appln. No. 10-2019-7025531 dated Nov. 9, 2020. English machine translation provided.
International Search Report issued in International Application No. PCT/JP2018/002293 dated Mar. 20, 2018. English translation provided.
Written Opinion issued in International Application No. PCT/JP2018/002293 dated Mar. 20, 2018.
Office Action issued in Japanese Appln. No. 2017-047750 dated Jun. 23, 2020. English machine translation provided.
English translation of Written Opinion issued in Intl. Appln. No. PCT/JP2018/002293 dated Mar. 20, 2018, previously cited in IDS filed Sep. 10, 2019.
International Preliminary Report on Patentability issued in Intl. Appln. No. PCT/JP2018/002293 dated Sep. 26, 2019. English translation provided.
Office Action issued in Chinese Appln. No. 201880017238.1 dated Sep. 9, 2020. English machine translation provided.
Office Action issued in Chinese Appln. No. 201880017238.1 dated Feb. 27, 2020. English translation provided.
Office Action issued in Korean Appln. No. 10-2019-7025531 dated Dec. 15, 2020. English machine translation provided.

* cited by examiner

ACCUMULATOR

TECHNICAL FIELD

The present invention relates to an accumulator used in a hydraulic circuit.

BACKGROUND ART

Conventionally, metal bellows accumulators (accumulating/buffering device) are used in hydraulic circuits such as a hydraulic oil circuit of a hydraulic control device or a hydraulic oil circuit using a shock absorber. The metal bellows accumulator generally includes a pressure vessel formed by joining a bottomed cylindrical shell and a cover by welding or the like. The pressure vessel accommodates a bellows mechanism including a bellows which is flexible in the longitudinal direction (axial direction) of the shell and a partition plate (bellows cap) composed of a metal member and a seal adhering to the metal member having a trapezoidal cross-section.

In such an accumulator, the interior of the pressure vessel is divided by the bellows mechanism into a gas chamber and a liquid chamber (oil chamber). In the pressure vessel, pressure fluctuation in liquid flowing into the hydraulic circuit and the accumulator is buffered by the swell and shrink function of gas in the gas chamber in response to expansion and contraction of the bellows mechanism (see Patent Documents 1 and 2, for instance).

The aforementioned conventional accumulator is connected at one end of the pressure vessel (e.g., cover-side end in the longitudinal direction of the pressure vessel) to the hydraulic circuit so that a liquid (working fluid) can flow between the hydraulic circuit and the liquid chamber via a communication hole provided in the cover.

CITATION LIST

Patent Literature

Patent Document 1: JP3148349U
Patent Document 2: JP2012-237415A

SUMMARY

Problems to be Solved

However, the conventional accumulator requires many components and many man-hours since the pressure vessel is formed by joining multiple members by welding. Further, since the accumulator is composed of multiple members, it is difficult to achieve coaxial accuracy between a thread portion for attaching the accumulator to the hydraulic oil circuit and a tool engagement portion for applying a rotational force to the thread portion.

In view of this, an object of the present invention is to provide an accumulator whereby it is possible to easily improve the coaxial accuracy between the thread portion and the tool engagement portion.

Solution to the Problems (1) An accumulator according to some embodiments comprises: a pressure vessel; and a partition portion separating an interior space of the pressure vessel into a liquid chamber and a gas chamber so that a volume ratio between the liquid chamber and the gas chamber in the pressure vessel is variable. The pressure vessel includes: a first section including a thread portion for fastening the accumulator to a support member; and a second section joined to the first section and formed by a single piece including a tool engagement portion capable of engaging with a tool for rotating the accumulator. The first section and the second section are fitted together by mating portions coaxial with the thread portion and the tool engagement portion.

With the above configuration (1), since the second section formed by a single piece having the tool engagement portion is positioned relative to the first section having the thread portion by mate fitting, it is possible to easily improve the coaxial accuracy between the thread portion and the tool engagement portion.

(2) In some embodiments, in the accumulator described in the above (1), the partition portion includes a bellows configured to expand and contract along an axial direction of the thread portion. The first section further includes: an internal cylinder portion disposed on an inner peripheral side of the bellows and protruding toward the liquid chamber; and a flange portion connected to an end of the internal cylinder portion so as to extend from the internal cylinder portion toward an outer periphery of the accumulator and having an inner surface to which one end of the bellows is fixed. The second section is formed by the single piece including: an external cylinder portion extending along the axial direction of the thread portion; and a bottom plate portion connected to an end of the external cylinder portion opposite to the first section, extending in a plane perpendicular to the axial direction, and having the tool engagement portion. The mating portion for fitting the second section is formed in the inner surface of the flange portion on an outer peripheral side of a fixation portion at the one end of the bellows.

With the above configuration (2), in addition to the same effect as the accumulator described in the above (1), in particular, the mating portion, which is a dividing position between the first section and the second section, is formed in the inner surface of the flange portion of the first section, on the outer peripheral side of the fixation portion of the bellows. Thus, since the second section does not exist on the outer peripheral side of the flange portion of the first section in a state before the second section is fitted to the first section, it is possible to easily weld the bellows to the first section.

(3) In some embodiments, in the accumulator described in the above (2), the first section is formed by a single piece including the internal cylinder portion and the flange portion.

With the above configuration (3), in addition to the same effect as the accumulator described in the above (1), in particular, since the first section is formed by a single piece, the number of components and thus the cost are expected to be reduced, compared with the case where the internal cylinder portion and the flange portion separately formed are joined by welding or the like. Further, since it is unnecessary to weld the internal cylinder portion and the flange portion, the manufacturing procedure of the accumulator is simplified. Thus, in addition to the reduction in cost, the quality of products can be easily controlled.

(4) In some embodiments, in the accumulator described in the above (2) or (3), the tool engagement portion is formed so as to protrude from the bottom plate portion in a direction opposite to the gas chamber.

With the above configuration (4), in addition to the same effect as the accumulator described in the above (2) or (3), in particular, by forming the tool engagement portion so as to protrude from the bottom plate portion in a direction opposite to the gas chamber, it is possible to bring the bottom plate portion around the tool engagement portion close to the first section. Accordingly, it is possible to reduce the volume of the gas chamber formed by the bottom plate portion and the external cylinder portion of the second section, compared with the case where the tool engagement portion is recessed from the bottom plate portion toward the gas chamber, under the same condition of stroke length of the bellows. Thus, it is possible to reduce the amount of a fluid sealed in the gas chamber for adjusting the gas amount.

(5) In some embodiments, in the accumulator described in the above (2) or (3), the tool engagement portion is formed so as to be recessed from the bottom plate portion toward the gas chamber.

With the above configuration (5), in addition to the same effect as the accumulator described in the above (2) or (3), in particular, it is possible to obtain the accumulator with the tool engagement portion recessed from the bottom plate portion toward the gas chamber.

(6) In some embodiments, in the accumulator described in the above (1), the partition portion includes a bellows configured to expand and contract along an axial direction of the thread portion. The first section includes: an external cylinder portion extending along the axial direction of the thread portion; and a bottom plate portion connected to an end of the external cylinder portion opposite to the second section and extending in a plane perpendicular to the axial direction. The second section is formed by the single piece including a cover plate portion provided with the tool engagement portion and having an inner surface to which one end of the bellows is fixed. The mating portion for fitting the first section is formed in the inner surface of the cover plate portion on an outer peripheral side of a fixation portion at the one end of the bellows.

With the above configuration (6), in addition to the same effect as the accumulator described in the above (1), in particular, the mating portion, which is a dividing position between the first section and the second section, is formed in the inner surface of the cover plate portion of the second section, on the outer peripheral side of the fixation portion of the bellows. Thus, since the first section does not exist on the outer peripheral side of the cover plate portion of the second section in a state before the first section is fitted to the second section, it is possible to easily weld the bellows to the second section (cover plate portion).

(7) In some embodiments, in the accumulator described in the above (6), the tool engagement portion is formed so as to be recessed from the cover plate portion toward the gas chamber.

With the above configuration (7), in addition to the same effect as the accumulator described in the above (6), in particular, by forming the tool engagement portion so as to be recessed toward the gas chamber from the cover plate portion, it is possible to bring a region of the cover plate portion provided with the tool engagement portion close to the first section. Accordingly, it is possible to reduce the volume of the gas chamber formed by the cover plate portion of the second section and the external cylinder portion of the first section, compared with the case where the tool engagement portion protrudes from the cover plate portion in a direction opposite to the gas chamber, under the same conditions of stroke length of the bellows. Thus, it is possible to reduce the amount of a fluid sealed in the gas chamber for adjusting the gas amount.

Advantageous Effects

With an accumulator according to some embodiments of the present invention, it is possible to easily improve the coaxial accuracy between the thread portion and the tool engagement portion.

DETAILED DESCRIPTION

Illustrative embodiments of the present invention will now be described with reference to the accompanying drawings. It is intended, however, that unless particularly specified, dimensions, materials, shapes, relative positions and the like of components described in the embodiments shall be interpreted as illustrative only and not intended to limit the scope of the present invention unless particularly specified.

First Embodiment

Figure 1:
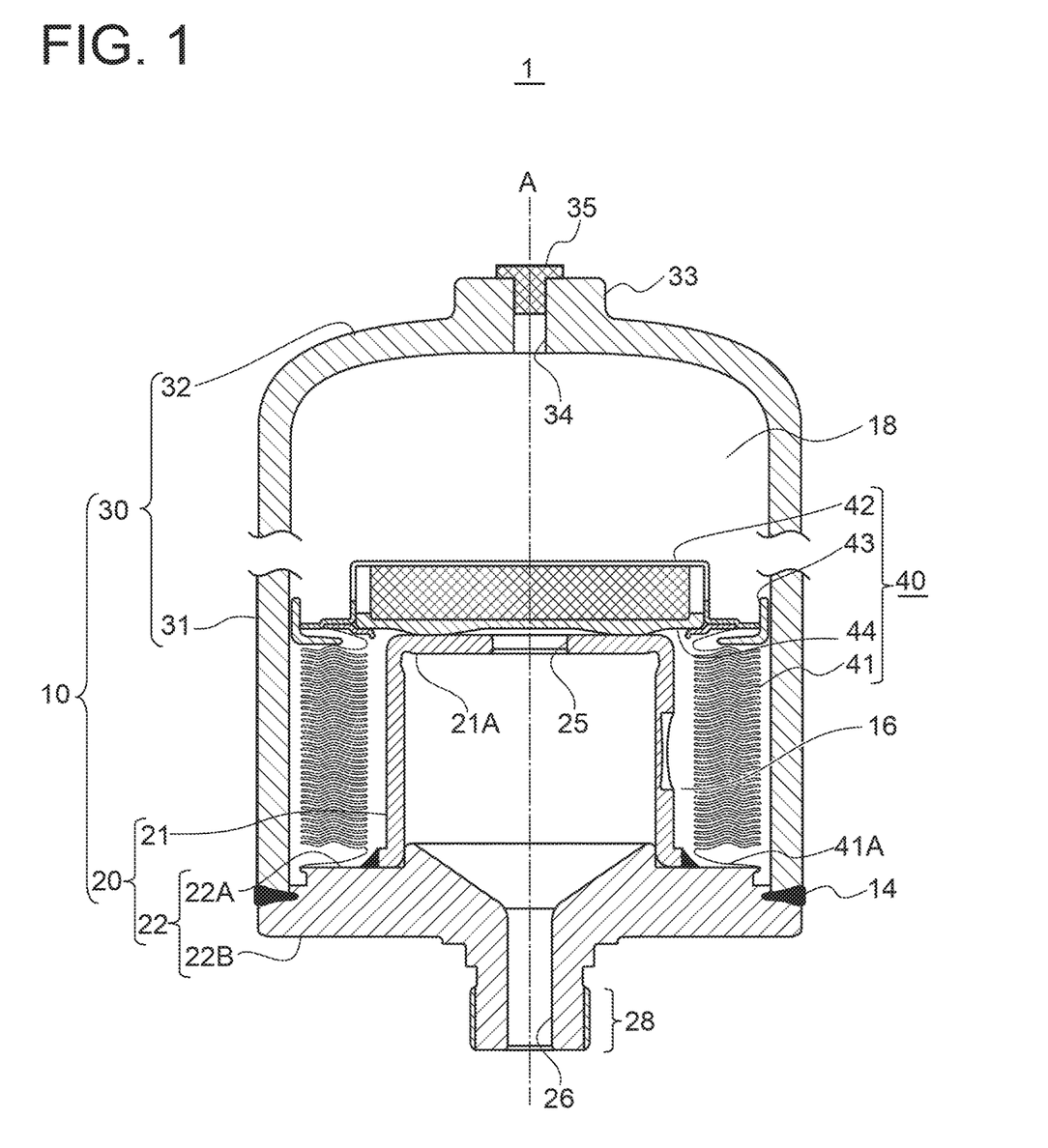
FIG. 1 is a vertical cross-sectional view of an accumulator according to some embodiments.

FIG. 1 is a vertical cross-sectional view of an accumulator 1 according to some embodiments of the present invention. As shown in this figure, the accumulator 1 includes a pressure vessel 10 and a partition portion accommodated in the pressure vessel 10 and separating the interior space of the pressure vessel 10 into a liquid chamber 16 and a gas chamber 18. In some embodiments, the accumulator 1 may be a so-called bellows accumulator including a bellows mechanism 40 accommodated in the pressure vessel 10 as the partition portion. The bellows mechanism 40 separates the interior space of the pressure vessel 10 so that a volume ratio between the liquid chamber 16 (oil chamber) and the gas chamber 18 in the pressure vessel 10 is variable.

Such an accumulator 1 is connectable to, for instance, a hydraulic oil circuit for brake or clutch in a vehicle and allows hydraulic oil (working fluid) to flow out of or into the hydraulic oil circuit. That is, the accumulator 1 functions as a buffer device which absorbs or accumulates pressure fluctuation (e.g., pulsation) in hydraulic oil in the hydraulic oil circuit.

In some embodiments, the accumulator 1 may be a so-called outside gas type accumulator 1 in which the liquid chamber 16 is located inside the bellows mechanism 40

(partition portion) while the gas chamber 18 (i.e., gas storage portion) is located outside the bellows mechanism 40 (see FIG. 1, for instance).

In some embodiments, the pressure vessel 10 includes a first section 20 and a second section 30 joined to each other along a weld line 14.

First, a configuration of the second section 30 will be described.

In some embodiments, the second section 30 includes an external cylinder portion 31 formed by a substantially cylindrical steel material (steel pipe) and a bottom plate portion 32 having a substantially circular plate shape and closing one end of the external cylinder portion 31 in a direction of the central axis A.

In some embodiments, the external cylinder portion 31 extends along the axial direction (central axis A) of a thread portion 28. In some embodiments, the bottom plate portion 32 is connected to an end of the external cylinder portion 31 opposite to the first section 20 and extends in a plane perpendicular to the axial direction (central axis A).

In some embodiments, the second section 30 may be formed as an integral structure in which the external cylinder portion 31 and the bottom plate portion 32 are continuously formed by a single member. That is, the second section 30 may be formed such that the external cylinder portion 31 and the bottom plate portion 32 are continuous by processing such as pressing or forging, for instance. In some embodiments, the second section 30 may be formed such that the external cylinder portion 31 and the bottom plate portion 32 are continuous along a smooth curve. With this configuration, it is possible to form the pressure vessel 10 in a shape which is unlikely to cause cracks and corrosion due to stress concentration, for instance.

In some embodiments, the bottom plate portion 32 of the second section 30 is provided with a tool engagement portion 33 capable of engaging with a tool for rotating the accumulator 1 about the central axis A, a through hole 34 for charging a gas from the outside of the accumulator 1 into the gas chamber 18 inside the accumulator 1, and a gas sealing stopper 35 for sealing the through hole 34 after the gas is charged into the gas chamber 18.

Figure 2:
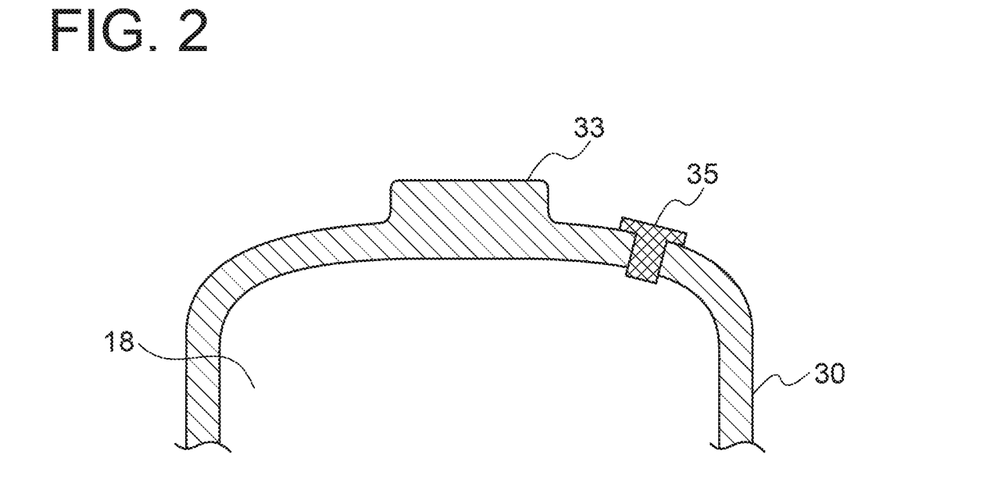
FIG. 2 is a partial cross-sectional view of a shell according to another embodiment.

In some embodiments, the tool engagement portion 33 may be formed so as to protrude outward along the direction of the central axis A and centered on the central axis A in the bottom plate portion 32 of the second section 30 (see FIGS. 1 and 2, for instance). More specifically, the tool engagement portion 33 may protrude from the bottom plate portion 32 in a direction opposite to the gas chamber 18. Such a convex tool engagement portion 33 only needs to be able to engage with a tool for imparting a rotational force about the central axis A to the accumulator 1, and may have a variety of polygonal shapes, such as triangle, square, pentagon, hexagon, octagon or star.

Thus, with the accumulator 1 according to some embodiments, by forming the tool engagement portion 33 so as to protrude from the bottom plate portion 32 in a direction opposite to the gas chamber 18, it is possible to bring the bottom plate portion 32 around the tool engagement portion 33 close to the first section 20. Accordingly, it is possible to reduce the volume of the gas chamber 18 formed by the bottom plate portion 32 and the external cylinder portion 31 of the second section 30, compared with the case where the tool engagement portion 33 is recessed from the bottom plate portion 32 toward the gas chamber 18, under the same condition of stroke amount of the bellows 41. Thus, it is possible to reduce the amount of a fluid sealed in the gas chamber 18 for adjusting the gas amount.

Figure 3:
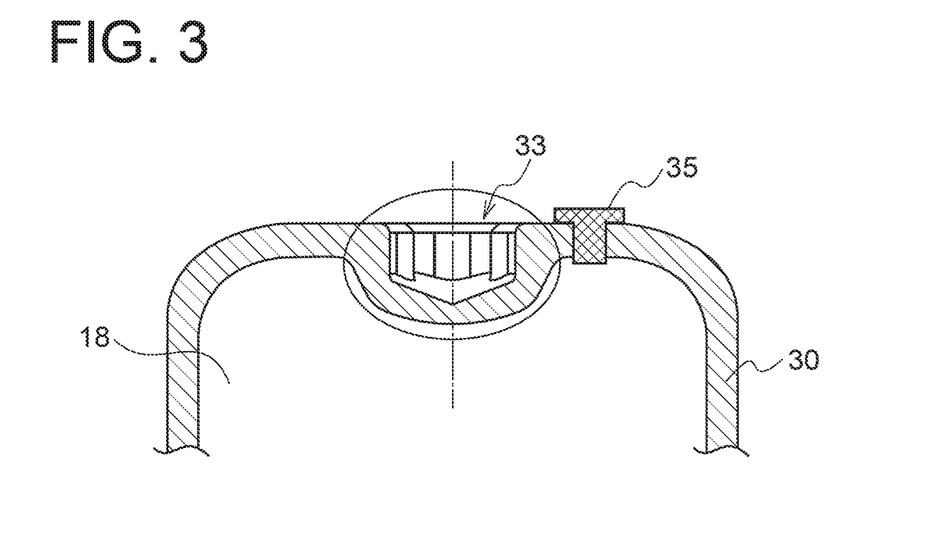
FIG. 3 is a partial cross-sectional view of a shell according to another embodiment.

In some embodiments, the tool engagement portion 33 may be formed so as to be recessed (concave) inward along the central axis A and centered on the central axis A in the bottom plate portion 32 (see FIG. 3, for instance). Such a concave tool engagement portion 33 only needs to be able to engage with a tool for imparting a rotational force about the central axis A to the accumulator 1, and may be a recess having a variety of shapes, such as cross (+) or slot (−), polygon such as triangle, square, pentagon, hexagon, octagon, star, or Torx (registered trademark).

In some embodiments, the through hole 34 and the gas sealing stopper 35 may be placed along the central axis A (see FIG. 1, for instance), or may be offset and displaced from the central axis A and the tool engagement portion 33 in the radial direction (see FIGS. 2 and 3, for instance).

In some embodiments, the gas sealing stopper 35 is attached to the bottom plate portion 32 by welding such as resistance welding to seal the through hole 34 after the gas is charged into the gas chamber 18.

Next, the first section 20 will be described.

In some embodiments, the first section 20 includes a bottomed cylindrical internal cylinder portion 21 concentric with the external cylinder portion 31 inside the external cylinder portion 31 of the second section 30, a flange portion 22 extending from one end of the internal cylinder portion 21 toward the outer periphery (outward in the radial direction of the internal cylinder portion 21), and a thread portion 28 for fastening the accumulator 1 to a support member.

In some embodiments, the internal cylinder portion 21 is formed on the inner peripheral side of a bellows 41, described later, so as to protrude toward the liquid chamber 16. A bottom 21A of the internal cylinder portion 21 may be a substantially circular flat plate extending perpendicular to the central axis A. At least one through hole 25 connecting a hydraulic oil circuit (hydraulic circuit) and the liquid chamber 16 is formed at the center of the bottom 21A of the internal cylinder portion 21 (see FIG. 1, for instance).

In some embodiments, the flange portion 22 is connected to a support-member-side end of the internal cylinder portion 21 so as to extend outward in the radial direction of the internal cylinder portion 21 (toward the outer periphery) from the end of the internal cylinder portion 21. In some embodiments, the internal cylinder portion 21 and the flange portion 22 are connected and integrated by welding.

In some embodiments, the flange portion 22 is connected at the outermost edge to the other end of the external cylinder portion 31. That is, the outer diameter of the flange portion 22 is substantially the same as the outer diameter of the external cylinder portion 31.

In some embodiments, the flange portion 22 has an inner surface 22A facing toward the liquid chamber 16 which is inside the pressure vessel 10 and an outer surface 22B facing toward a support member which is outside the pressure vessel 10. A fixation portion 41A (see FIG. 1, for instance) disposed at one end of the bellows 41 is fixed to the inner surface 22A by welding. The welding may be electron beam welding or laser beam welding, for instance.

In some embodiments, a mating portion 29 for fitting the second section 30 is formed in the inner surface 22A of the flange portion 22 on the outer peripheral side of the fixation portion 41A disposed at one end of the bellows 41. Thus, with the accumulator 1 according to some embodiments, since the second section 30 does not exist on the outer peripheral side of the flange portion 22 of the first section 20 in a state before the second section 30 is fitted to the first section 20, it is possible to easily weld the bellows 41 to the first section 20.

In some embodiments, the thread portion 28 is formed on an outer peripheral surface of a projection protruding outward from the outer surface 22B of the flange portion 22 along the central axis A. Inside the projection, a through hole 26 connecting the hydraulic oil circuit and a space surrounded by the internal cylinder portion 21 and the flange portion 22 inside the pressure vessel 10 is formed along the direction of the central axis A.

Next, the bellows mechanism 40 will be described.

In some embodiments, the bellows mechanism 40 (partition portion) includes a bellows 41 (metal bellows) configured to expand and contract along the axial direction (central axis A) of the thread portion 28, a disc-like bellows cap 42 connected to the other end of the bellows 41, a bellows guide 43 disposed on the outer periphery of the bellows cap 42, and a seal 44 disposed on the liquid chamber 16 side of the bellows cap 42.

In some embodiments, the bellows guide 43 guides and moves the bellows 41, the bellows cap 42, and the seal 44 along the direction of the central axis A in accordance with the change in volume ratio between the liquid chamber 16 and the gas chamber 18 due to inflow and outflow of hydraulic oil between the hydraulic oil circuit and the liquid chamber 16. In some embodiments, the bellows guide 43 abuts on the inner peripheral surface of the external cylinder portion 21 so as to ensure liquid-tight and gas-tight properties between the liquid chamber 16 and the gas chamber 18. In some embodiments, the bellows guide 43 is configured to slidably move on and along the inner peripheral surface of the external cylinder portion 21 (in the direction of the central axis A) in response to the change in volume ratio between the liquid chamber 16 and the gas chamber 18. FIG. 1 shows a state where the bellows mechanism 40 contracts and the volume ratio of the liquid chamber 16 is minimized.

The seal 44 (stay self seal) liquid-tightly seals the liquid chamber 16 when the bellows 41 maximally contracts, i.e., when the volume ratio of the liquid chamber 16 is minimized while the volume ratio of the gas chamber 18 is maximized (see FIG. 1, for instance).

In some embodiments, the first section 20 and the second section 30 are fitted together by mating portions 29, 39 coaxial with the thread portion 28 and the tool engagement portion 33. Thus, since the second section 30 formed by a single piece having the tool engagement portion 33 is positioned relative to the first section 20 having the thread portion 28 by mate fitting, it is possible to easily improve the coaxial accuracy between the thread portion 28 and the tool engagement portion 33.

The mating portion 29 of the flange portion 22 (first section) and the mating portion 39 of the external cylinder portion 31 (second section) may have any shape that enables the external cylinder portion 31 and the tool engagement portion 33 of the pressure vessel 10 to be coaxial with the thread portion 28 of the pressure vessel 10, and various mating form can be used.

Figure 4:
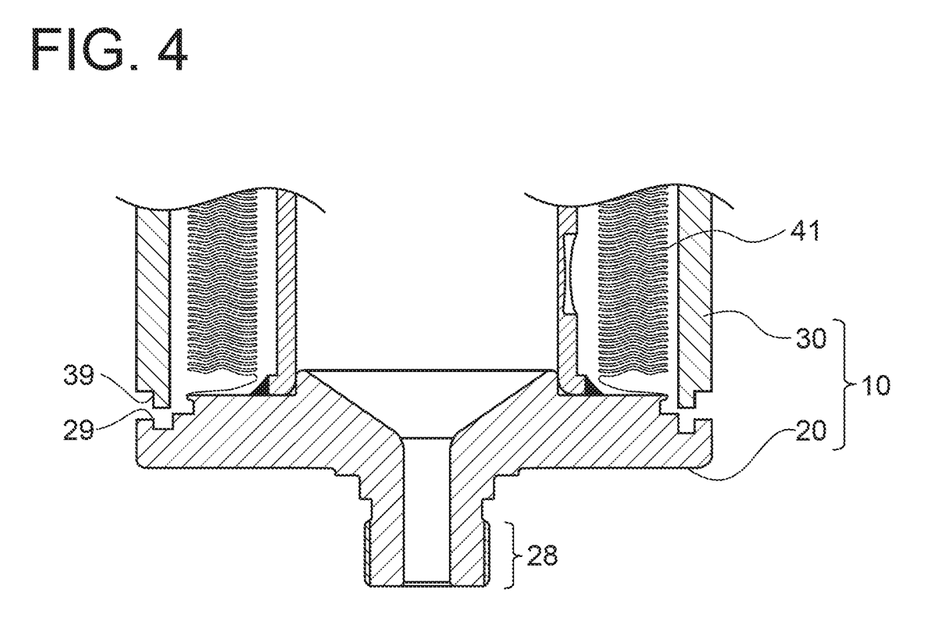
FIG. 4 is a partial cross-sectional view of a shell according to some embodiments.

In some embodiments, for instance, as shown in FIG. 4, the mating portion 39 at the other end of the external cylinder portion 31 in the direction of the central axis A may have a protruding portion annularly protruding toward the first section 20 on the inner peripheral side of the external cylinder portion 31 and a recessed portion on the outer peripheral side of the external cylinder portion 31. In this case, an outer peripheral edge portion of the inner surface 22A of the flange portion 22 is recessed so as to be mated with the protruding portion, and an outermost peripheral portion of the inner surface 22A annularly protrudes so as to be mated with the recessed portion.

Figure 5:
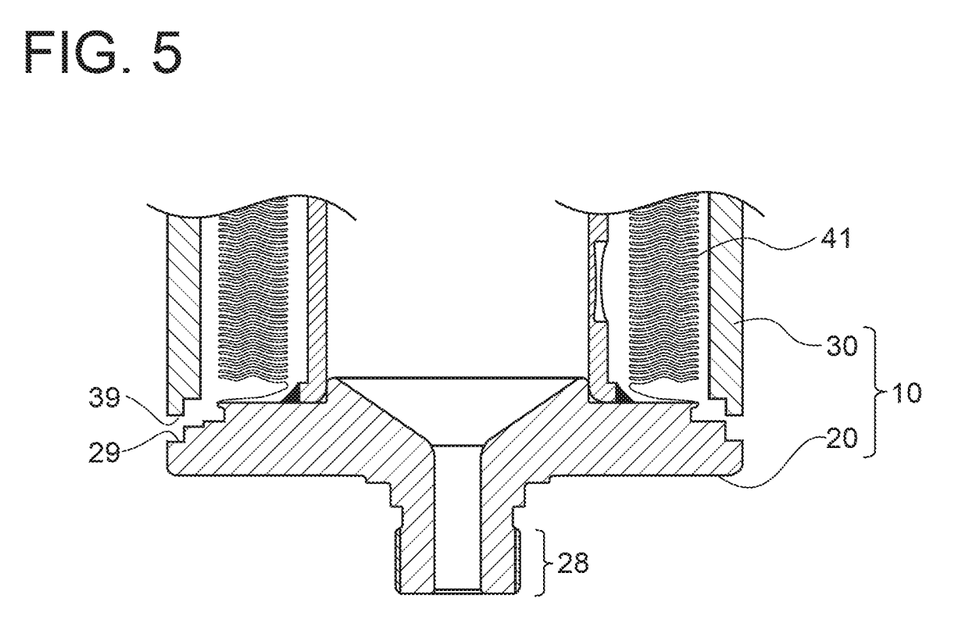
FIG. 5 is a partial cross-sectional view of a shell according to some embodiments.

Further, in some embodiments, for instance, as shown in FIG. 5, the mating portion 39 at the other end of the external cylinder portion 31 in the direction of the central axis A may have a protruding portion annularly protruding toward the first section 20 on the outer peripheral side of the external cylinder portion 31 and a recessed portion on the inner peripheral side of the external cylinder portion 31. In this case, an outermost peripheral portion of the inner surface 22A of the flange portion 22 is recessed so as to be mated with the protruding portion, and an inner side of this recess annularly protrudes so as to be mated with the recessed portion.

Second Embodiment

Figure 6:
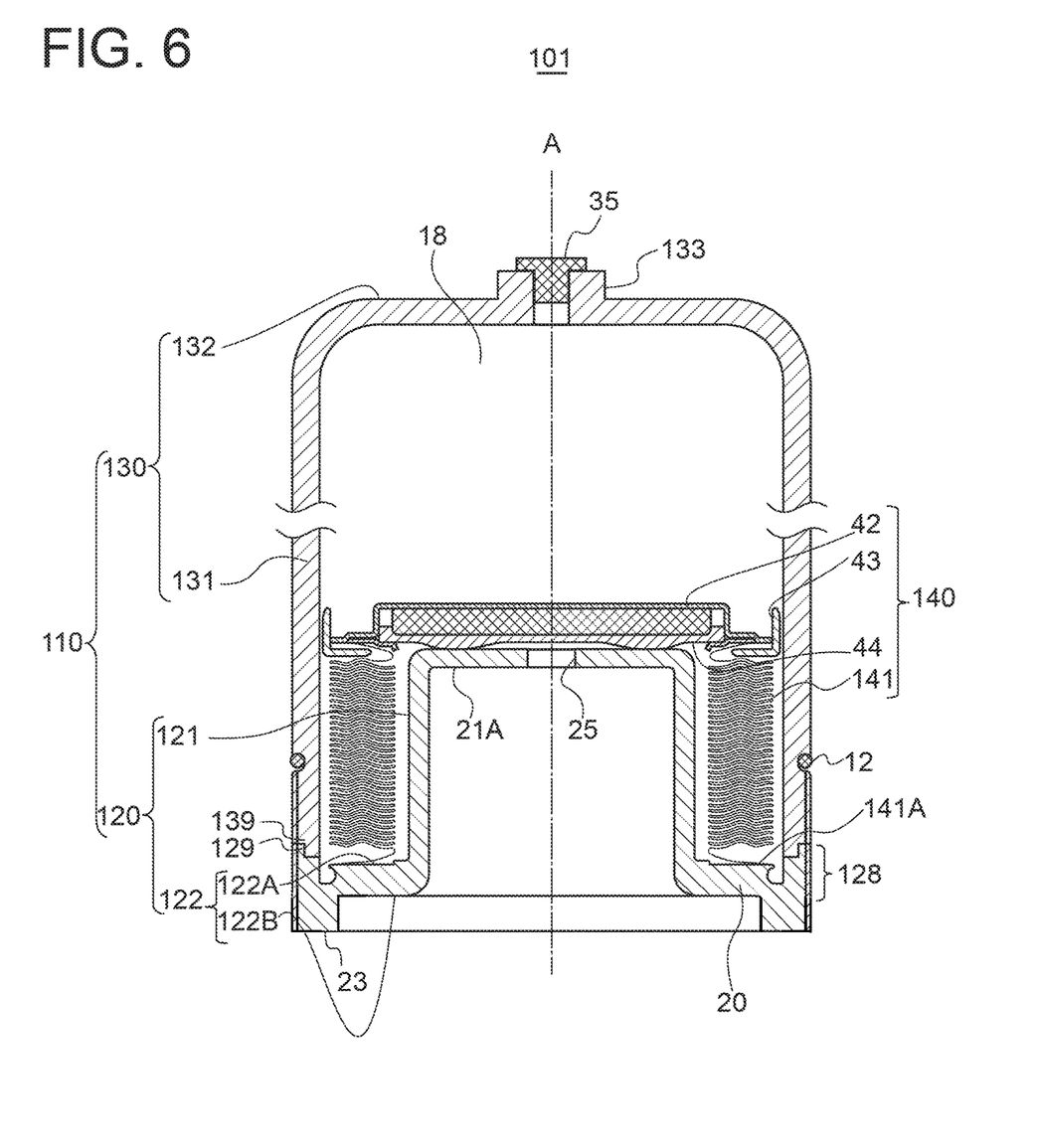
FIG. 6 is a vertical cross-sectional view of an accumulator according to some embodiments.

In some embodiments, for instance, as shown in FIG. 6, in an accumulator 101 having a bellows mechanism 140 of an outside gas type, the first section 120 may be formed by a single piece including an internal cylinder portion 121 and a flange portion 122. That is, the first section 120 may be formed such that the internal cylinder portion 121 and the flange portion 122 are continuous by processing such as pressing or forging, for instance. In some embodiments, the first section 120 may be formed such that the internal cylinder portion 121 and the flange portion 122 are continuous along a smooth curve. With this configuration, it is possible to form a pressure vessel 110 in a shape which is unlikely to cause cracks and corrosion due to stress concentration, for instance.

In some embodiments, the first section 120 may have a thread portion 128 disposed on the radially outermost side of the flange portion 122 (i.e., the outermost peripheral surface of the flange portion 122) for fastening the accumulator 101 to a support member. In this case, a thread portion contiguous to the thread portion 128 may be formed on the outer periphery of an end of an external cylinder portion 131 of the second section 130 adjacent to the first section 120 in the direction of the central axis A.

In some embodiments, the first section 120 and the second section 130 are fitted together by mating portions 129, 139 coaxial with the thread portion 128 and the tool engagement portion 133.

More specifically, in some embodiments, a mating portion 129 for fitting the second section 130 is formed in an inner surface 122A of the flange portion 122 on the outer peripheral side of a fixation portion 141A disposed at one end of the bellows 141. The mating portion 129 may be formed at an outer peripheral end of the flange portion 122 so as to be adjacent to the thread portion 128.

The mating portion 129 of the flange portion 122 (first section) and the mating portion 139 of the external cylinder portion 131 (second section) may have any shape that enables the external cylinder portion 131 and the tool engagement portion 133 of the pressure vessel 110 to be coaxial with the thread portion 128 of the pressure vessel 110, and various mating form can be used. For instance, as shown in FIG. 6, the other end of the external cylinder portion 131 in the direction of the central axis A may have a protruding portion annularly protruding toward the first section 120 on the inner peripheral side of the external cylinder portion 131 and a recessed portion on the outer peripheral side of the external cylinder portion 131. In this case, an outer peripheral edge portion of the inner surface 122A of the flange portion 122 is recessed so as to be mated with the protruding portion, and an outermost peripheral portion of the inner surface 122A annularly protrudes so as to be mated with the recessed portion. Further, the projections and the recesses on the inner peripheral side and the outer peripheral side of the mating portions 129, 139 may be reverse to that of FIG. 6, for instance, as shown in FIG. 5.

In some embodiments, an outer surface 122B of the flange portion 122 may have an abutting portion 23 to abut on a support member. That is, the first section 120 may include the abutting portion 23 configured to abut on a support member when the accumulator 1 is fastened to the support member. The abutting portion 23 may be an annular projection formed by an outer peripheral portion of the flange portion 122 protruding toward the support member at a predetermined thickness. In some embodiments, the abutting portion 23 is formed with a predetermined width (thickness) so as to come into surface contact with the support member. In another embodiments, the abutting portion 23 may be formed with a relatively thin thickness so as to come into line contact with the support member. The thickness, shape and position of the abutting portion 23 may be appropriately designed so that hydraulic oil in the hydraulic oil circuit is appropriately sealed by the abutting portion 23, the thread portion 128 and an O-ring 12 or the like when the accumulator 1 is attached to the support member by the thread portion 128.

With the above configuration, since the second section 130 formed by a single piece having the tool engagement portion 133 is positioned relative to the first section 120 having the thread portion 128 by mate fitting, it is possible to easily improve the coaxial accuracy between the thread portion 128 and the tool engagement portion 133.

With the accumulator 101 according to the above embodiments, since both the thread portion 128 and the tool engagement portion 133 are formed in the first section 120 as an integral structure, it is possible to easily improve the coaxial accuracy between the thread portion 128 and the tool engagement portion 133.

With the accumulator 101 according to some embodiments, since the first section 120 is formed by a single piece, the number of components and thus the cost are expected to be reduced, compared with the case where the internal cylinder portion and the flange portion separately formed are joined by welding or the like. Further, since it is unnecessary to weld the internal cylinder portion 121 and the flange portion 122, the manufacturing procedure of the accumulator 101 is simplified. Thus, in addition to the reduction in cost, the quality of products can be easily controlled.

Third Embodiment

Figure 7:
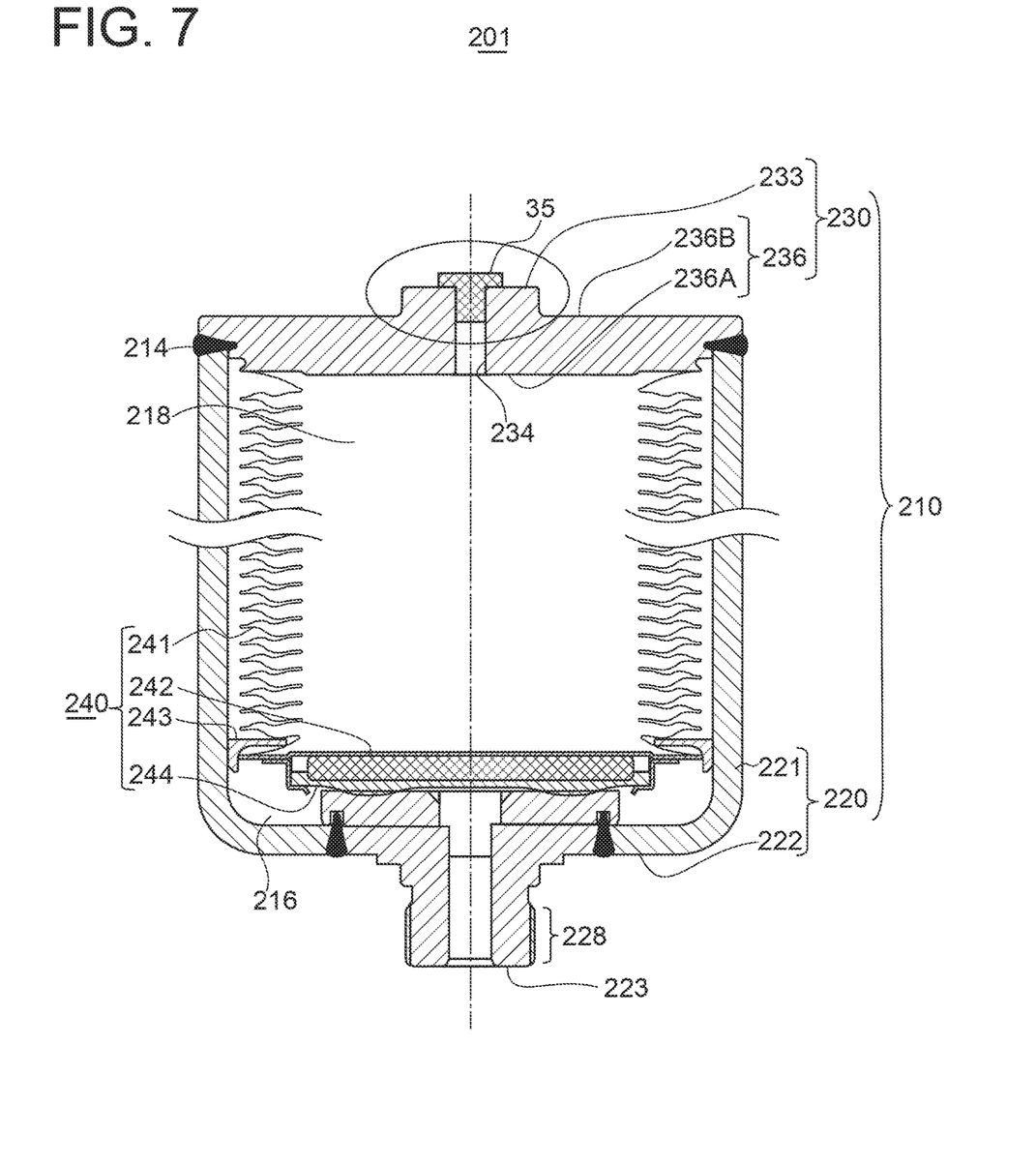
FIG. 7 is a vertical cross-sectional view of an accumulator according to some embodiments.

In some embodiments, an accumulator 201 may be a so-called inside gas type accumulator 201 in which a liquid chamber 216 is located outside a bellows mechanism 240 (partition portion) while a gas chamber 218 (gas storage portion) is located inside the bellows mechanism 240 (see FIG. 7, for instance).

In some embodiments, a pressure vessel 210 includes a first section 220 and a second section 230 joined to each other along a weld line 214.

The first section 220 includes an external cylinder portion 221 formed by a substantially cylindrical steel material (steel pipe) and a bottom plate portion 222 having a substantially annular plate shape and closing one end of the external cylinder portion 221 in the direction of the central axis A. In some embodiments, the external cylinder portion 221 extends along the axial direction of a thread portion 228. The bottom plate portion 222 is connected an end of the external cylinder portion 221 opposite to the second section 230 and extends in a plane perpendicular to the axial direction (central axis A).

In some embodiments, the first section 220 may be formed as an integral structure in which the external cylinder portion 221 and the bottom plate portion 222 are continuously formed by a single member. That is, the first section 220 may be formed such that the external cylinder portion 221 and the bottom plate portion 222 are continuous by processing such as pressing or forging, for instance. In some embodiments, the first section 220 may be formed such that the external cylinder portion 221 and the bottom plate portion 222 are continuous along a smooth curve. With this configuration, it is possible to form the pressure vessel 210 in a shape which is unlikely to cause cracks and corrosion due to stress concentration, for instance.

In some embodiments, a port 223 is connected to the inner peripheral side of the bottom plate portion 222. In some embodiments, the port 223 and the bottom plate portion 222 are formed integrally by welding. In some embodiments, the thread portion 228 is formed on the outer periphery of the port 223. The thread portion 228 is formed coaxially with the central axis A. In some embodiments, the external cylinder portion 221, the bottom plate portion 222, and the port 223 thus integrally formed may function as the first section 220.

As shown in FIGS. 7 to 10, in some embodiments, the second section 230 is formed by a single piece including a cover plate portion 236 provided with a tool engagement portion 233 and having an inner surface 236A to which one end of a bellows 241 is fixed.

Figure 9:
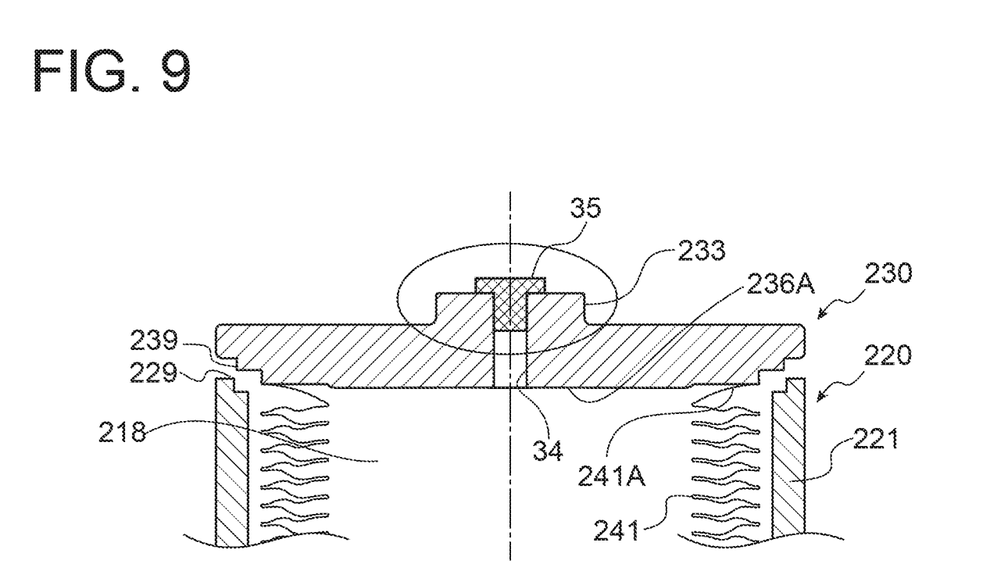
FIG. 9 is a partial cross-sectional view of a shell according to some embodiments.
Figure 10:
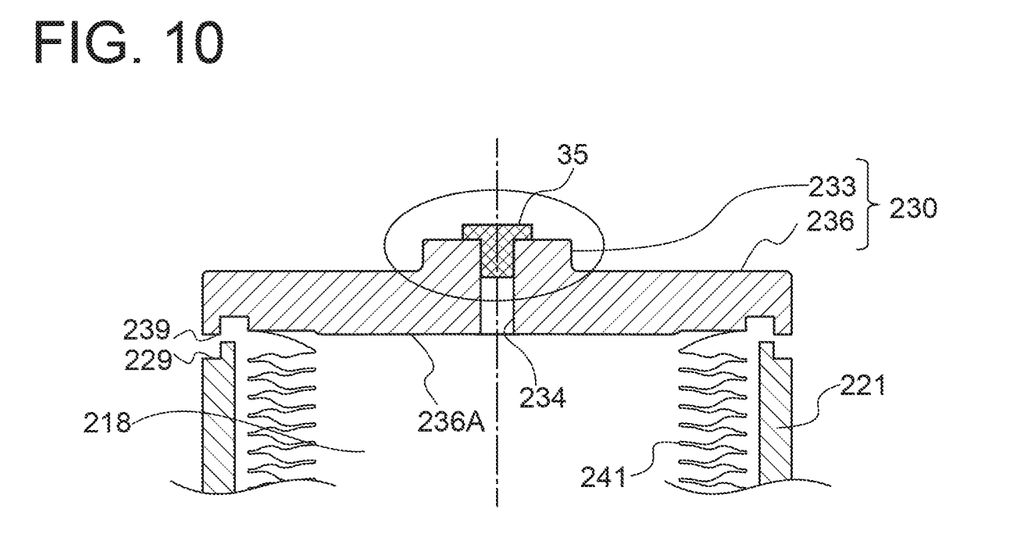
FIG. 10 is a partial cross-sectional view of a shell according to some embodiments.

In some embodiments, the tool engagement portion 233 may be formed so as to protrude outward along the direction of the central axis A and centered on the central axis A in the cover plate portion 236 of the second section 230 (see FIGS. 7, 9 and 10, for instance).

Figure 8:
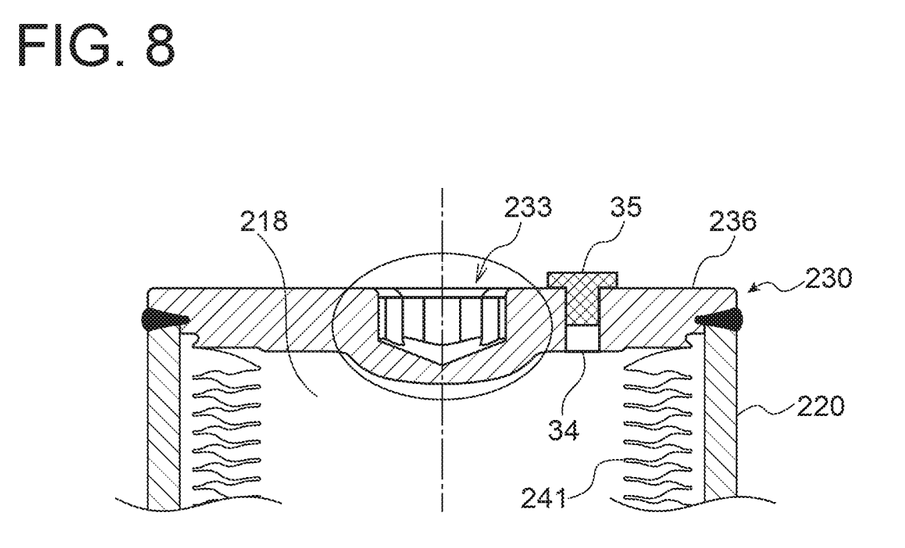
FIG. 8 is a partial cross-sectional view of a shell according to another embodiment.

In some embodiments, the tool engagement portion 233 may be formed so as to be recessed toward the gas chamber 218 from the cover plate portion 236 (see FIG. 8, for instance).

In some embodiments, a mating portion 239 for fitting the first section 220 is formed in the inner surface 236A of the cover plate portion 236 on the outer peripheral side of the fixation portion 241A disposed at one end of the bellows 241.

In some embodiments, for instance, as shown in FIG. 9, the mating portion 239 has a stepped portion annularly formed so as to face the first section 220 at an outer peripheral edge portion of the inner surface 236A of the cover plate portion 236, including a recessed portion on the outermost side. In this case, an inner peripheral portion at the other end of the external cylinder portion 221 in the direction of the central axis A is recessed so as to be mated with the stepped portion, and an outer peripheral portion of the external cylinder portion 221 annularly protrudes.

Further, in some embodiments, for instance, as shown in FIG. 10, the mating portion 229 at the other end of the external cylinder portion 221 in the direction of the central axis A may have a protruding portion annularly protruding toward the second section 230 on the inner peripheral side of the external cylinder portion 221 and a recessed portion on the outer peripheral side of the external cylinder portion 221. In this case, an outermost peripheral portion of the inner surface 236A of the cover plate portion 236 protrudes so as to be mated with the recessed portion, and an inner side of this protrusion is recessed so as to be mated with the protruding portion.

In some embodiments, the bellows mechanism 240 functions as the partition portion which separates the interior space of the pressure vessel 210 into the liquid chamber 216 and the gas chamber 218 so that a volume ratio between the liquid chamber 216 and the gas chamber 218 in the pressure vessel 210 is variable. In some embodiments, the bellows mechanism 240 includes a bellows 241 (metal bellows) configured to expand and contract along the axial direction (central axis A) of the thread portion 228, a disc-like bellows cap 242 connected to the other end of the bellows 241, a bellows guide 243 disposed on the outer periphery of the bellows cap 242, and a seal 244 disposed on the liquid chamber 216 side of the bellows cap 242.

In some embodiments, the bellows guide 243 guides and moves the bellows 241, the bellows cap 242, and the seal 244 along the direction of the central axis A in accordance with the change in volume ratio between the liquid chamber 216 and the gas chamber 218 in response to inflow and outflow of hydraulic oil between the hydraulic oil circuit and the liquid chamber 216. In some embodiments, the bellows guide 243 abuts on the inner peripheral surface of the external cylinder portion 221 so as to ensure liquid-tight and gas-tight properties between the liquid chamber 216 and the gas chamber 218. In some embodiments, the bellows guide 243 is configured to slidably move on and along the inner peripheral surface of the external cylinder portion 221 (in the direction of the central axis A) in response to the change in volume ratio between the liquid chamber 216 and the gas chamber 218. FIG. 7 shows a state where the bellows mechanism 240 expands and the volume ratio of the liquid chamber 216 is minimized.

The seal 244 (stay self seal) liquid-tightly seals the liquid chamber 216 when the bellows 241 maximally expands, i.e., when the volume ratio of the liquid chamber 216 is minimized while the volume ratio of the gas chamber 218 is maximized (see FIG. 7, for instance).

With the accumulator 201 according to the above embodiments, the mating portion 239, which is a dividing position between the first section 220 and the second section 230, is formed in the inner surface 236A of the cover plate portion 236 of the second section 230, on the outer peripheral side of the fixation portion 241A of the bellows 241. Thus, since the first section 220 does not exist on the outer peripheral side of the cover plate portion 236 of the second section 230 in a state before the first section 220 is fitted to the second section 230, it is possible to easily weld the bellows 241 to the second section 230 (cover plate portion 236).

With the accumulator 201 according to some embodiments, by forming the tool engagement portion 233 so as to be recessed toward the gas chamber 218 from the cover plate portion 236, it is possible to bring a region of the cover plate portion 236 provided with the tool engagement portion 233 close to the first section 220 (see FIG. 8). Accordingly, it is possible to reduce the volume of the gas chamber 218 formed by the cover plate portion 236 of the second section 230 and the external cylinder portion 221 of the first section 220, compared with the case where the tool engagement portion 233 protrudes from the cover plate portion 236 in a direction opposite to the gas chamber 218 (see FIGS. 7, 9, and 10, for instance), under the same conditions of stroke length of the bellows 241. Thus, it is possible to reduce the amount of a fluid sealed in the gas chamber 218 for adjusting the gas amount.

Embodiments of the present invention were described in detail above, but the present invention is not limited thereto, and various amendments and modifications may be implemented.

REFERENCE SIGNS LIST 1, 101, 201 Accumulator
10, 110 Pressure vessel
12 O-ring
14, 114 Weld line
16, 116, 216 Liquid chamber (Oil chamber)
18, 118, 218 Gas chamber
20, 120, 220 First section
21, 121 Internal cylinder portion
21A Bottom
22, 122 Flange portion
22A, 122A Inner surface
22B Outer surface
23 Abutting portion
25 Through hole
26 Through hole
28, 128, 228 Thread portion
29, 129, 229 Mating portion
30, 130, 230 Second section
31, 131, 221 External cylinder portion
32, 132 Bottom plate portion
33, 133, 233 Tool engagement portion
34 Through hole
35 Gas sealing stopper
39, 139, 239 Mating portion
40, 140, 240 Bellows mechanism (Partition portion)
41, 141, 241 Bellows
41A, 141A, 241A Fixation portion
42, 242 Bellows cap
43, 243 Bellows guide
44, 244 Seal
223 Port
236 Cover plate portion
236A Inner surface
236B Outer surface
A Central axis

The invention claimed is:
1. An accumulator comprising:
a pressure vessel; and
a partition portion separating an interior space of the pressure vessel into a liquid chamber and a gas chamber so that a volume ratio between the liquid chamber and the gas chamber in the pressure vessel is variable,
wherein the pressure vessel includes:
a first section including a thread portion for fastening the accumulator to a support member; and
a second section joined to the first section and including a tool engagement portion capable of engaging with a tool for rotating the accumulator, and
wherein the first section and the second section are fitted together by mating portions coaxial with the thread portion and the tool engagement portion,
wherein the partition portion includes a bellows configured to expand and contract along an axial direction of the thread portion,
wherein the first section further includes:
an internal cylinder portion disposed on an inner peripheral side of the bellows and protruding toward the liquid chamber; and
a flange portion connected to an end of the internal cylinder portion so as to extend from the internal cylinder portion toward an outer periphery of the accumulator, the flange portion having an inner surface to which one end of the bellows is fixed,
wherein the second section includes:

an external cylinder portion extending along the axial direction of the thread portion; and a bottom plate portion connected to an end of the external cylinder portion opposite to the first section, the bottom plate portion extending in a plane perpendicular to the axial direction, the bottom plate portion having the tool engagement portion, wherein a mating portion of the first section for fitting the second section is formed in the inner surface of the flange portion on an outer peripheral side of a fixation portion at the one end of the bellows, and wherein the second section is formed by a single piece including the tool engagement portion and a joint end portion fitted with the first section at the mating portion of the first section, wherein the first section includes the thread portion on an outermost peripheral surface of the flange portion.

2. The accumulator according to claim 1, wherein the first section is formed by a single piece including the internal cylinder portion and the flange portion.

3. The accumulator according to claim 1, wherein the tool engagement portion is formed so as to protrude from the bottom plate portion in a direction opposite to the gas chamber.

4. The accumulator according to claim 1, wherein the tool engagement portion is formed so as to be recessed from the bottom plate portion toward the gas chamber.

5. The accumulator according to claim 1, further comprising a gas sealing stopper for sealing a through hole formed in the tool engagement portion of the bottom plate portion, the through hole communicating with the gas chamber.

6. The accumulator according to claim 5, wherein the gas sealing stopper forms a portion of an outermost surface of the accumulator.

7. The accumulator according to claim 5, wherein the gas chamber directly communicates with an outside of the accumulator via the through hole in a case where the gas sealing stopper is not sealing the through hole.

8. The accumulator according to claim 5, wherein the through hole formed in the tool engagement portion is disposed in the tool engagement portion at a location corresponding to a central axis about which the accumulator is rotatable by the tool for rotating the accumulator.

9. The accumulator according to claim 1, wherein the second section includes an additional thread portion on an outer periphery of the external cylinder portion, the additional thread portion being continuous to the thread portion of the first section.

10. The accumulator according to claim 1, wherein the mating portions include a first non-threaded step surface on the first section and a second non-threaded step surface on the second section that, when mated with each other, position the second section and the first section relative to each other.

* * * * *